United States Patent
Rácz et al.

(10) Patent No.: US 11,202,230 B2
(45) Date of Patent: Dec. 14, 2021

(54) TECHNIQUE FOR ENABLING MULTIPATH TRANSMISSION

(71) Applicant: Telefonaktiebolaget LM Ericsson (publ), Stockholm (SE)

(72) Inventors: Sándor Rácz, Cegléd (HU); Ferenc Fejes, Debrecen (HU); Geza Szabo, Kecskemet (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 144 days.

(21) Appl. No.: 16/603,607

(22) PCT Filed: May 19, 2017

(86) PCT No.: PCT/EP2017/062085
§ 371 (c)(1),
(2) Date: Oct. 8, 2019

(87) PCT Pub. No.: WO2018/210428
PCT Pub. Date: Nov. 22, 2018

(65) Prior Publication Data
US 2020/0359264 A1    Nov. 12, 2020

(51) Int. Cl.
*H04W 28/08* (2009.01)
*H04W 76/12* (2018.01)
(Continued)

(52) U.S. Cl.
CPC ....... *H04W 28/0819* (2020.05); *H04L 69/164* (2013.01); *H04L 69/22* (2013.01);
(Continued)

(58) Field of Classification Search
CPC .......... H04W 28/0819; H04W 12/033; H04W 76/12; H04W 76/11; H04W 76/16;
(Continued)

(56) References Cited

U.S. PATENT DOCUMENTS

2002/0141393 A1   10/2002   Eriksson et al.
2005/0086390 A1*   4/2005   Banerjee ................ H04L 69/22
                                                                709/250
(Continued)

OTHER PUBLICATIONS

Tsao, C. et al., "A Super-Aggregation Strategy for Multi-Homed Mobile Hosts with Heterogeneous Wireless Interfaces", Wireless Network, vol. 21 No. 2, Feb. 1, 2015, pp. 639-658, Springer.
(Continued)

*Primary Examiner* — Kiet Tang
(74) *Attorney, Agent, or Firm* — Coats + Bennett, PLLC (57) ABSTRACT

A technique for enabling connection-oriented multipath transmission is disclosed. A computing unit (110) for executing a multipath application (102) enabling connection-oriented multipath transmission between a client application (106) and a server (108) comprises at least one processor and at least one memory, wherein the at least one memory contains instructions executable by the at least one processor such that the multipath application (102) is operable to receive a packet from the client application (106), the packet being destined for the server (108) and associated with a connection established between the client application (106) and the server (108) using a connection-oriented transport protocol, select an interface from a plurality of interfaces of the computing unit (110) for transmission of the packet to a multipath proxy (104) for delivery to the server (108), and transmit the packet to the multipath proxy (104) via the selected interface.

20 Claims, 6 Drawing Sheets

(51) Int. Cl.
  *H04W 76/11* (2018.01)
  *H04W 76/16* (2018.01)
  *H04L 29/06* (2006.01)
  *H04W 12/033* (2021.01)
  *H04W 80/06* (2009.01)

(52) U.S. Cl.
  CPC ..... *H04W 12/033* (2021.01); *H04W 28/0967* (2020.05); *H04W 76/11* (2018.02); *H04W 76/12* (2018.02); *H04W 76/16* (2018.02); *H04W 80/06* (2013.01)

(58) Field of Classification Search
  CPC . H04W 28/0967; H04W 80/06; H04W 28/08; H04W 28/0215; H04W 12/03; H04L 69/164; H04L 69/22; H04L 49/70; H04L 69/326; H04L 69/14; H04L 69/18; H04L 47/24; H04L 45/24
  See application file for complete search history.

(56) References Cited

U.S. PATENT DOCUMENTS

| | | |
|---|---|---|
| 2013/0064198 A1 | 3/2013 | Krishnaswamy et al. |
| 2015/0100426 A1 | 4/2015 | Hartzell et al. |
| 2017/0150470 A1* | 5/2017 | Kalapatapu ....... H04W 28/0215 |
| 2017/0155590 A1* | 6/2017 | Dillon ................. H04L 41/5025 |
| 2018/0006764 A1* | 1/2018 | Howes ..................... H04L 65/80 |
| 2019/0182165 A1* | 6/2019 | Yang ...................... H04L 47/14 |
| 2019/0363974 A1* | 11/2019 | Wang ..................... H04L 45/24 |

OTHER PUBLICATIONS

Ferlin, S. et al., "Revisiting Congestion Control for Multipath TCP with Shared Bottleneck Detection", 35th Annual IEEE International Conference on Computer Communications, Apr. 10, 2016, pp. 1-9, IEEE.

Szabó, G. et al., "Network Enhancement of Web Rendering Time", 2015 IEEE Conference on Computer Communications Workshops, Apr. 26, 2015, pp. 1-2, IEEE.

Singh, V. et al., "Multipath RTP (MPRTP)", Internet-Draft, Nov. 14, 2014, pp. 1-40, AVT Core Working Group.

Internet Society, "IETF Journal", vol. 12 No. 2, Nov. 1, 2016, pp. 1-36, IETF.

Szabó, G. et al., "Media QoE Enhancement With QUIC", IEEE Infocom 2016 Live/Video Demonstration, Apr. 10, 2016, pp. 1-2, IEEE.

* cited by examiner

TECHNIQUE FOR ENABLING MULTIPATH TRANSMISSION

TECHNICAL FIELD

The present disclosure generally relates to the field of network communication. In particular, a technique for enabling connection-oriented multipath transmission between a client application and a server is presented. The technique may be embodied in apparatuses, systems, methods, and computer programs.

BACKGROUND

In recent years, multipath transmission has evolved as a general concept that allows the concurrent use of multiple paths (i.e., network links) to maximize resource usage and increase redundancy for network connections. An example implementation is MultiPath TCP (MPTCP) which enables Transmission Control Protocol (TCP) connections to use multiple paths for the purpose of bandwidth aggregation, better resource utilization and improved reliability. More specifically, MPTCP enables the simultaneous use of Internet Protocol (IP) addresses and corresponding interfaces by a modification of TCP that presents a regular TCP interface to applications, while in fact spreading and transmitting data across several paths.

The functional goals of MPTCP are mainly directed to improved throughput and improved resilience to network failures. For improved throughput, MPTCP allows the concurrent use of multiple paths in a manner so that a connection over multiple paths achieves no worse throughput than a single TCP connection over the best constituent path. For improved resilience, MPTCP allows using multiple paths interchangeably, by permitting segments to be sent and re-sent on any available path.

Similar to TCP, MPTCP is implemented in kernel space and provided to applications through the operating system of the underlying host. MPTCP supports backward compatibility with existing TCP based Application Programming Interfaces (APIs) so that existing applications can make use of MPTCP without effectively being aware of employing multipath transmission, simply by upgrading the operating system of the underlying host. MPTCP therefore provides an application agnostic solution that supports TCP based multipath transmission, but can only be provided on platforms with a correspondingly upgraded operating system kernel. MPTCP also cannot provide an application agnostic multipath solution for applications that employ other transport protocols than TCP.

A key target of employing multipath transmission is the improvement of Quality of Experience (QoE) perceived by users. In current 3GPP architectures, for example, Quality of Service (QoS) is supported via the so-called network initiated dedicated bearer concept, in which the initiation of QoS differentiation takes place in the network. According to this concept, the network operator takes the responsibility for setting up an appropriate set of bearers for a given User Equipment (UE) and sets the corresponding parameters for the respective bearers. The network operator may use packet filters or Deep Packet Inspection (DPI) functionality to classify packets into the respective bearers in the downlink direction and the network operator may download packet filters to the UEs to enable them to classify packets into the respective bearers in the uplink direction. The network initiated bearer concept has been motivated by the desire to not rely on the UEs to configure the appropriate QoS for the traffic to be handled. In fact, experience has shown that UE applications are sometimes unable to properly set the QoS parameters and classify traffic into the proper QoS class, partly due to a lack of necessary operating system APIs provided to the applications, and partly due to the fact that application developers sometimes do not have the knowledge and experience to set QoS parameters and classify the traffic properly.

SUMMARY

Accordingly, there is a need for a technique that enables connection-oriented multipath transmission and that avoids one or more of the problems discussed above, or other problems.

According to a first aspect, a computing unit for executing a multipath application enabling connection-oriented multipath transmission between a client application and a server is provided. The computing unit comprises at least one processor and at least one memory, wherein the at least one memory contains instructions executable by the at least one processor such that the multipath application is operable to receive a packet from the client application, the packet being destined for the server and associated with a connection established between the client application and the server using a connection-oriented transport protocol, select an interface from a plurality of interfaces of the computing unit for transmission of the packet to a multipath proxy for delivery to the server, and transmit the packet to the multipath proxy via the selected interface.

The client application may be any kind of application that can be executed on the computing unit. As a mere example, the client application may be a web browser that sends web requests to the server. Similarly, the server may be any kind of server with which the client application may interact, such as a web server, application server, database server, or the like. The computing unit may be any kind of computing unit that has an operating system installed on which the multipath application may be executed, including, but not limited to, a personal computer, laptop, tablet, smartphone, or the like.

The client application and the server may communicate with each other using the connection-oriented transport protocol as they would normally do without multipath transmission and, therefore, both the client application and the server may be unaware that their communication makes use of multipath transmission. The multipath application and the multipath proxy may be seen as intermediate components in the communication between the client application and the server so that, consequently, the client application and the server do not communicate directly with each other but via the multipath application (acting as a proxy on the client application side) and the multipath proxy (acting as a proxy on the server side). In combination, the multipath application and the multipath proxy may enable multipath transmission using the connection-oriented transport protocol so that, among the communication path between the client application and the server, the portion between the multipath application and the multipath proxy may employ multipath transmission. An application agnostic multipath solution may thus be provided.

The computing unit may comprise a plurality of interfaces (i.e., network interfaces), each of which may be associated with a different network technology. For example, one of the plurality of interfaces may be a mobile communication network interface, such as a Long Term Evolution (LTE) interface, and another one of the plurality of interfaces may be a Wireless Local Area Network (WLAN) interface. When the packet is received by the multipath application from the client application, the multipath application may select the interface that is to be used for transmission of the packet to the multipath proxy for further delivery to the server. Upon selecting the interface, the packet may be transmitted to the multipath proxy via the selected interface.

Typical connection-oriented transport protocols employed nowadays comprise TCP, for example. However, the connection-oriented transport protocol used for the technique presented herein, e.g., for communication between the client application and the server, may also be given by a user space (e.g., application layer) based transport protocol, such as Quick UDP Internet Connections, QUIC, for example.

The QUIC protocol is a multiplexed and secure transport protocol atop the User Datagram Protocol (UDP). QUIC packets may be authenticated and encrypted. The header of a QUIC packet may contain unencrypted fields including a Connection ID (CID) field and a Sequence Number (SN) field. The payload of QUIC packets may be encrypted. The CID may represent a random number that uniquely identifies the established connection. QUIC connections are generally designed to remain established even when the client device roams, i.e., in situations in which the typical 4-tuple of TCP/IP or UDP/IP (i.e., source IP, source port, destination IP, destination port) may be insufficient to identify the connection. The SN may be assigned to each QUIC packet by the sender of the packet and may be incremented for subsequent packets of the sender.

When the multipath application receives the packet from the client application, it may identify the connection to which the packet belongs. The at least one memory may thus further contain instructions executable by the at least one processor such that the multipath application is operable to identify the connection by extracting a connection identification from the packet, wherein the connection identification uniquely identifies the connection. In the QUIC protocol, the connection identification may be given by the CID. For secure data transmission, the connection identification may be included in a non-encrypted header of the packet, wherein a payload of the packet may be encrypted.

When it comes to selecting the interface to be used for transmission of the packet to the multipath proxy, the interface may be selected based on a QoS requirement regarding the identified connection. A QoS requirement may be determined based on (e.g., user initiated) activities observed on the execution level of the client application and/or on the network layer level with respect to the identified connection, for example. The QoS requirement may be determined by the multipath application itself or may be determined by a dedicated QoE monitoring application that may communicate with the multipath application and provide the determined QoS requirement to the multipath application accordingly. The QoS requirement may also be provided by the client application to the multipath application directly.

QoS requirements may differ depending on whether the packet is transmitted in a QoE sensitive period or in a QoE insensitive period. A QoE sensitive period may be a period in which a high level of QoS is required to ensure that a high level of QoE is provided to a user. A QoE insensitive period, on the other hand, may be a period in which a lower level of QoS may be sufficient without having a (noticeably) negative impact on the QoE perceived by the user. In web browsing, for example, the QoE sensitive period may correspond to the start render time, i.e., the time required until elements of a web page are first displayed and become interactive, so that visual feedback provides evidence that the browser is responsive and enables to start browsing. Typically, the start render time is recommended to be in the range of 1 to 2 seconds. The QoE insensitive period may be the subsequent download period in which background images of the web page are loaded, for example. In video playback, as another example, the QoE sensitive period may correspond to the initial buffering time before the playback of the video is started, whereas QoE insensitive periods may correspond to periods in which the video buffer is sufficiently filled so that QoS variations do not have a negative impact on the QoE perceived by the user.

Depending on whether the packet is transmitted in a QoE sensitive period or in a QoE insensitive period, a different interface may be selected for transmission of the packet to the multipath proxy. The selected interface may thus correspond to a first interface of the plurality of interfaces when the packet is transmitted in a QoE sensitive period, and the selected interface may correspond to a second interface of the plurality of interfaces when the packet is transmitted in a QoE insensitive period. For example, when the packet is transmitted as part of QoE sensitive traffic (i.e., in a QoE sensitive period), the packet may be transmitted via a mobile communication network (e.g., LTE) interface, and subsequent packets may be transmitted via a WLAN interface of the computing unit as part of QoE insensitive traffic (i.e., in a QoE insensitive period).

Alternatively or additionally, the interface may be selected based on a QoS measurement regarding the plurality of interfaces. The QoS measurement may include a measurement of the reception quality on at least one of the plurality of interfaces. For example, it may be decided that the packet may be transmitted via a mobile communication network (e.g., LTE) interface when the QoS measurement indicates that reception quality on a WLAN interface of the computing unit is not satisfactory, or vice versa.

For security reasons, the packet may be transmitted through a Virtual Private Network (VPN) tunnel established between the multipath application and the multipath proxy. The at least one memory may thus further contain instructions executable by the at least one processor such that the multipath application is operable to establish, for each of the plurality of interfaces, a VPN tunnel associated with the respective interface with the multipath proxy, wherein the packet may be transmitted through the VPN tunnel associated with the selected interface.

In order to reduce transmission overhead due to the use of VPN tunnels, the packet may be modified before transmitting the packet through the VPN tunnel. More specifically, the transport layer header (e.g., the UDP header in case of QUIC) and/or the network layer header (e.g., the IP header in case of QUIC) of the packet may be removed from the packet, provided that corresponding header restoration data is stored by both the multipath application and the multipath proxy. Such header removal may generally be possible because the connection (including the corresponding endpoints) may be uniquely defined by the connection identification (e.g., the CID in case of QUIC). The at least one memory may thus further contain instructions executable by the at least one processor such that the multipath application is operable to store header restoration data indicating an association of the connection identification with at least one of a transport layer header and a network layer header of packets associated with the connection, and transmit the header restoration data to the multipath proxy. Additionally, the at least one memory may contain instructions executable by the at least one processor such that the multipath application is operable to remove at least one of a transport layer header and a network layer header from the packet before transmitting the packet through the VPN tunnel associated with the selected interface. As an example, the header restoration data may be provided in the form of key-value pairs, wherein the connection identification (e.g., the CID in case of QUIC) may be used as the key and the transport layer header (e.g., the UDP header in case of QUIC) and/or the network layer header (e.g., the IP header in case of QUIC), or at least portions thereof, may be used as the value of the respective key-value pair. The header restoration data may be sent using a custom VPN control message to the multipath proxy, for example. When the multipath proxy extracts the connection identification from the packet, it may use the header restoration data to restore the transport layer header and/or the network layer header in accordance with the header restoration data based on the unique connection identification.

Equivalent header modification may applied to response packets that the multipath application receives from the multipath proxy through a VPN tunnel. In these cases, the multipath proxy may have removed the transport layer header and/or network layer header from the response packet before transmitting the response packet through the VPN tunnel. The at least one memory may then further contain instructions executable by the at least one processor such that the multipath application is operable to receive a response packet from the multipath proxy through the VPN tunnel associated with the selected interface, wherein the response packet is originated from the server and associated with the connection, identify the connection associated with the response packet by extracting a connection identification from the response packet, and restore at least one of the transport layer header and the network layer header of the response packet in accordance with the stored header restoration data based on the extracted connection identification of the response packet.

The multipath application may also support packet reordering to ensure that response packets that are received from the multipath proxy on different interfaces are brought into correct order before delivering the response packets to the client application. The at least one memory may thus further contain instructions executable by the at least one processor such that the multipath application is operable to receive a plurality of response packets from the multipath proxy, wherein the plurality of response packets are originated from the server and associated with the connection, and wherein a first portion of the plurality of response packets is received via a first interface of the plurality of interfaces and a second portion of the plurality of response packets is received via a second interface of the plurality of interfaces, extract, for each of the plurality of response packets, a sequence number from the respective response packet, and reorder the plurality of response packets according to the extracted sequence numbers before delivering the plurality of response packets to the client application. In case of QUIC, the sequence number may be the unencrypted SN contained in the public header of QUIC packets, as explained above.

As will be understood from the above, multipath transmission may be enabled by providing the multipath application and the multipath proxy as intermediate components in the communication between the client application and the server. The multipath application may be pre-installed on the computing unit and may be provided by a network operator, for example. In one implementation, the multipath application may be activatable and deactivatable by a user of the computing unit. When the multipath application is deactivated, corresponding traffic may completely bypass the multipath solution.

According to a second aspect, a computing unit for executing a multipath proxy enabling connection-oriented multipath transmission between a client application and a server is provided. The computing unit comprises at least one processor and at least one memory, wherein the at least one memory contains instructions executable by the at least one processor such that the multipath proxy is operable to receive a packet from a multipath application, the packet being originated from the client application and destined for the server, the packet being associated with a connection established between the client application and the server using a connection-oriented transport protocol, and the packet being received via a particular interface among a plurality of interfaces of the computing unit, and deliver the packet to the server.

The multipath proxy may correspond to the multipath proxy described above in relation to the computing unit of the first aspect. The multipath proxy may thus be an application that is complementary to the multipath application executed on the computing unit of the first aspect. Those aspects described with regard to the computing unit of the first aspect which are applicable to the computing unit of the second aspect may thus be comprised by the computing unit of the second aspect as well, and vice versa. Unnecessary repetitions are thus omitted in the following.

The computing unit of the second aspect may comprise a plurality of interfaces (i.e., network interfaces), each of which may be associated with a different network technology. In particular, the interfaces of the computing unit may correspond to the interfaces of the computing unit according to the first aspect.

As in the computing unit of the first aspect, the connection-oriented transport protocol may be a QUIC protocol. Also, the at least one memory may further contain instructions executable by the at least one processor such that the multipath proxy is operable to identify the connection by extracting a connection identification from the packet, wherein the connection identification uniquely identifies the connection. The connection identification may be included in a non-encrypted header of the packet, wherein a payload of the packet may be encrypted. For each of the plurality of interfaces, a VPN tunnel associated with the respective interface may be established between the multipath application and the multipath proxy, wherein the packet may be received through the VPN tunnel associated with the particular interface.

In order to reduce transmission overhead due to the use of VPN tunnels, the at least one memory may further contain instructions executable by the at least one processor such that the multipath proxy is operable to receive header restoration data from the multipath application, the header restoration data indicating an association of the connection identification with at least one of a transport layer header and a network layer header of packets associated with the connection, and store the header restoration data. When at least one of a transport layer header and a network layer header has been removed from the packet by the multipath application, the at least one memory may further contain instructions executable by the at least one processor such that the multipath proxy is operable to restore at least one of the transport layer header and the network layer header of the packet in accordance with the stored header restoration data based on the extracted connection identification of the packet.

In order to support packet reordering, the at least one memory may further contain instructions executable by the at least one processor such that the multipath proxy is operable to receive a plurality of packets from the multipath application, wherein the plurality of packets are originated from the client application and associated with the connection, and wherein a first portion of the plurality of packets is received via a first interface of the plurality of interfaces and a second portion of the plurality of packets is received via a second interface of the plurality of interfaces, extract, for each of the plurality of packets, a sequence number from the respective packet, and reorder the plurality of packets according to the extracted sequence numbers before delivering the plurality of packets to the server.

Other than the computing unit of the first aspect, the computing unit of the second aspect may select the interface to be used for transmission of response packets to the multipath application as the interface on which a recent packet associated with the connection has been received from the multipath application. The at least one memory may thus further containing instructions executable by the at least one processor such that the multipath proxy is operable to receive a response packet from the server, the response packet being destined for the client application and associated with the connection, and transmit the response packet to the multipath application for delivery to the client application, wherein the response packet is transmitted via an interface among the plurality of interfaces on which a recent packet associated with the connection has been received from the multipath application.

According to a third aspect, a system comprising a computing unit of the first aspect and a computing unit of the second aspect is provided.

According to a fourth aspect, a method performed by a multipath application is provided. The multipath application is executed on a computing unit and enables connection-oriented multipath transmission between a client application and a server. The method comprises receiving a packet from the client application, the packet being destined for the server and associated with a connection established between the client application and the server using a connection-oriented transport protocol, selecting an interface from a plurality of interfaces of the computing unit for transmission of the packet to a multipath proxy for delivery to the server, and transmitting the packet to the multipath proxy via the selected interface.

According to a fifth aspect, a method performed by a multipath proxy is provided. The multipath proxy is executed on a computing unit and enables connection-oriented multipath transmission between a client application and a server. The method comprises receiving a packet from a multipath application, the packet being originated from the client application and destined for the server, the packet being associated with a connection established between the client application and the server using a connection-oriented transport protocol, and the packet being received via a particular interface among a plurality of interfaces of the computing unit, and delivering the packet to the server.

It is to be noted that the apparatus features described herein with reference to the first and second aspects may also be embodied as functions, services or steps in the methods of the fourth and fifth aspects.

According to a sixth aspect, a computer program product is provided. The computer program product comprises program code portions for performing the method of at least one of the fourth and fifth aspect when the computer program product is executed on one or more computing devices. The computer program product may be stored on a computer readable recording medium, such as a semiconductor memory, DVD, CD-ROM, and so on. The computer program product may also be provided for download via a communication network (e.g., the Internet or a proprietary network).

BRIEF DESCRIPTION OF THE DRAWINGS

Embodiments of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details. For example, while the following embodiments will be described with regard to the QUIC protocol, it will be understood that the present disclosure shall not be limited to QUIC and that the technique presented herein may be practiced with other connection-oriented transport protocols. Further, it will be appreciated that the technique presented herein shall generally not be limited to IP based connectivity, but may also be employed for communication that uses non-IP based connectivity, as it may be the case in 5G mobile networks, for example.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
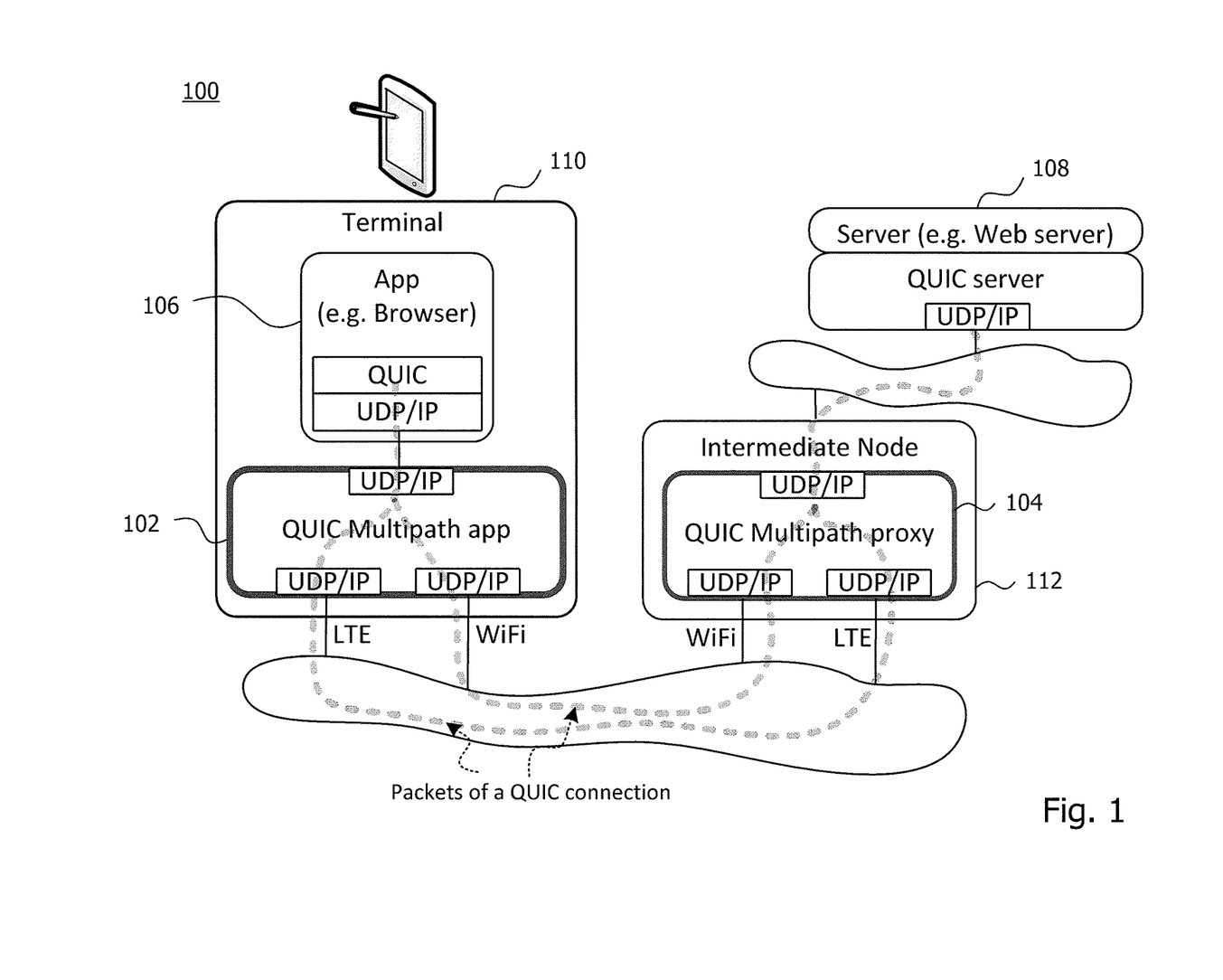
FIG. 1 schematically illustrates a system in which a multipath application and a multipath proxy are provided as intermediate components enabling multipath transmission in the communication between a client application and a server.

FIG. 1 schematically illustrates a system 100 in which a multipath application 102 and a multipath proxy 104 are provided as intermediate components enabling multipath transmission between a client application 106 and a server 108. The multipath application 102 is executed on a computing unit 110 and the multipath proxy 104 is executed on a computing unit 112. In the example of FIG. 1, the client application 106 is provided as a web browser (e.g., as a Chrome browser) and the server 108 is provided as a web server (e.g., as an Apache web server). It will be understood that this is merely exemplarily and that the client application 106 may generally be given by any kind of application that may be executed on the computing unit 110 and interact with the server 108. Similarly, it will be understood that the server 108 may be given by any other kind of computing unit with which the client application 106 may interact. In the illustrated example, the computing unit 110 is provided as a mobile terminal (e.g., a UE, such as a smartphone), but it will be understood that the computing unit 110 may be given by any other kind of computing unit which has an operating system installed (e.g., Android) on which the multipath application 102 may be executed.

The client application 106 and the server 108 may communicate with each other using a connection-oriented transport protocol as they would normally do without multipath transmission and, therefore, both the client application 106 and the server 108 may be unaware that their communication makes use of multipath transmission. The multipath application 102 and the multipath proxy 104 may be seen as intermediate components in the communication between the client application 106 and the server 108 so that, consequently, the client application 106 and the server 108 do not communicate directly with each other but via the multipath application 102 (acting as a proxy on the client application side) and the multipath proxy 104 (acting as a proxy on the server side). In combination, the multipath application 102 and the multipath proxy 104 may enable multipath transmission using the connection-oriented transport protocol so that, among the communication path between the client application 106 and the server 108, the portion between the multipath application 102 and the multipath proxy 104 may employ multipath transmission. An application agnostic multipath solution may thus be provided. In particular, since the multipath solution is realized by applications at the application layer, it may enable multipath transmission for applications that employ user space (e.g., application layer) based transport protocols which, in the present example, is QUIC. The multipath application 102 may be pre-installed on the computing unit 110 and may be provided by a network operator, for example. The multipath application 102 may be activatable and deactivatable by a user of the computing unit 110. When the multipath application 102 is deactivated, corresponding traffic may completely bypass the multipath solution.

In the example of FIG. 1, both the client application 106 and the multipath application 102 are executed on the same computing unit 110, but it will be understood that the client application 106 and the multipath application 102 may also be executed on separate computing units. For example, the multipath application 102 may be executed on an intermediate node in the network path between the client application 106 and the server 108. On the other hand, the multipath proxy 104 is provided in the illustrated example as a separate computing unit from the server 108 and, more specifically, as an intermediate node in the network path between the client application 106 and the server 108. It will be understood that the multipath proxy 104 could also be executed on the server 108 itself, for example.

Both the computing unit 110 and the computing unit 112 may comprise a plurality of interfaces (i.e., network interfaces), each of which may be associated with a different network technology. In particular, the interfaces of the computing unit 110 may correspond to the interfaces of the computing unit 112. In the illustrated example, each of the computing units 110 and 112 comprises a mobile communication network interface, more specifically an LTE interface, and a WLAN interface (denoted as "WiFi" in the figures). When a packet is received by the multipath application 102 from the client application 106, the multipath application 102 may select the interface that is to be used for transmission of the packet to the multipath proxy 104 for further delivery to the server 108. As indicated by the dashed line in FIG. 1, packets transmitted from the multipath application 102 to the multipath proxy 104 are received by the multipath proxy 104 via the corresponding interface of the computing unit 112.

While typical connection-oriented transport protocols employed nowadays comprise TCP, for example, the connection-oriented transport protocol used for communication between the client application 106 and the server 108 is, in the illustrated example, given by the user space (e.g., application layer) based transport protocol QUIC.

Figure 2A:
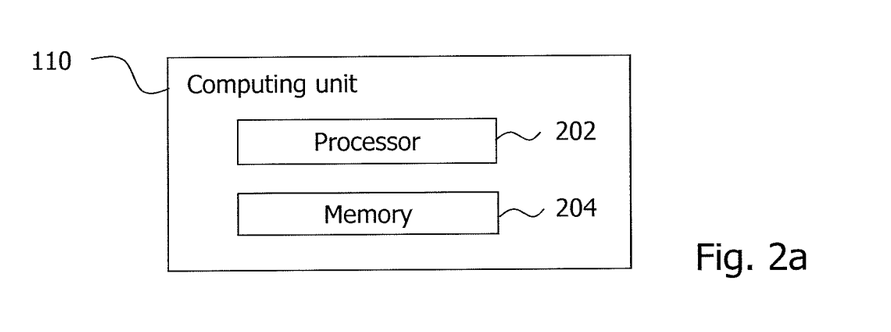
FIGS. 2a and 2b illustrate exemplary compositions of computing units configured to execute the multipath application and the multipath proxy of FIG. 1.

FIG. 2a illustrates an exemplary composition of the computing unit 110 which is configured to execute the multipath application 102. The computing unit 110 comprises at least one processor 202 and at least one memory 204, wherein the at least one memory 204 contains instructions executable by the at least one processor 202 such that the computing unit 110 is operable to carry out the method steps described herein with reference to the multipath application 102.

Figure 2B:
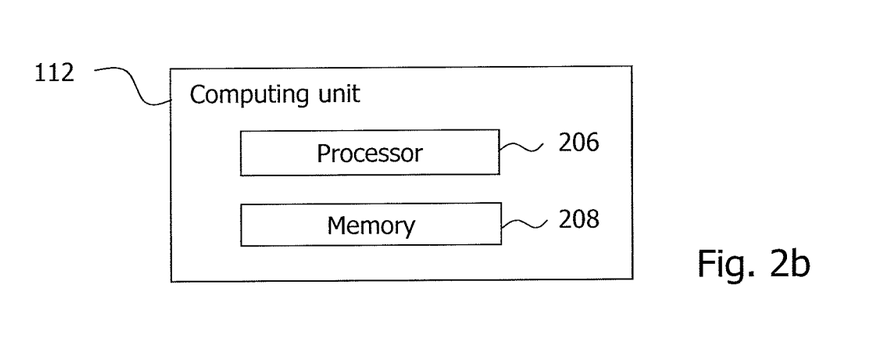

FIG. 2b illustrates an exemplary composition of a computing unit 112 which is configured to execute the multipath proxy 104. The computing unit 112 comprises at least one processor 206 and at least one memory 208, wherein the at least one memory 208 contains instructions executable by the at least one processor 206 such that the computing unit 112 is operable to carry out the method steps described herein with reference to the multipath proxy 104.

Figure 3A:
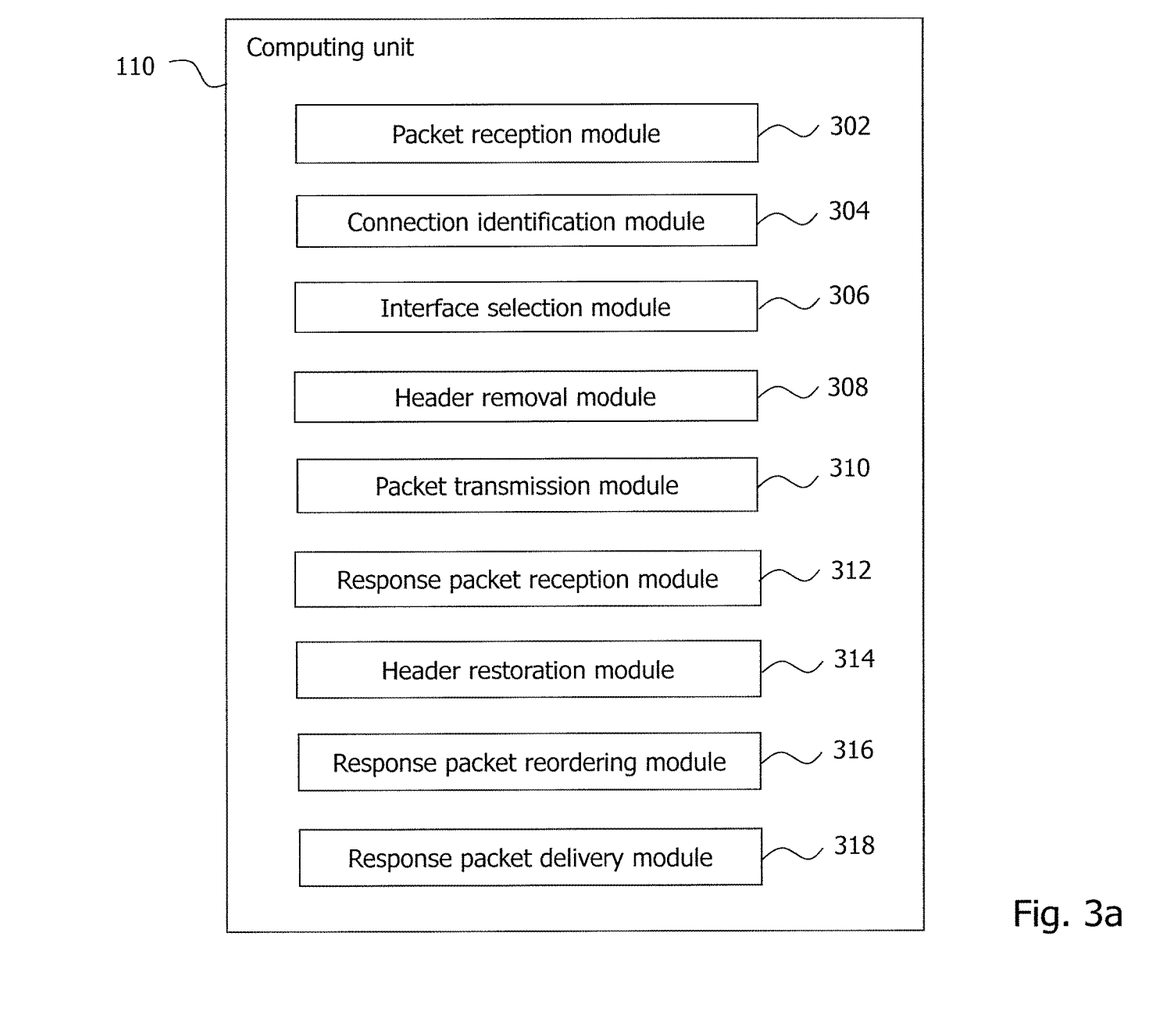
FIGS. 3a and 3b illustrate a modular composition of a computing unit configured to execute the multipath application of FIG. 1 and a corresponding flow diagram illustrating a method embodiment which may be performed by the multipath application.
Figure 3B:
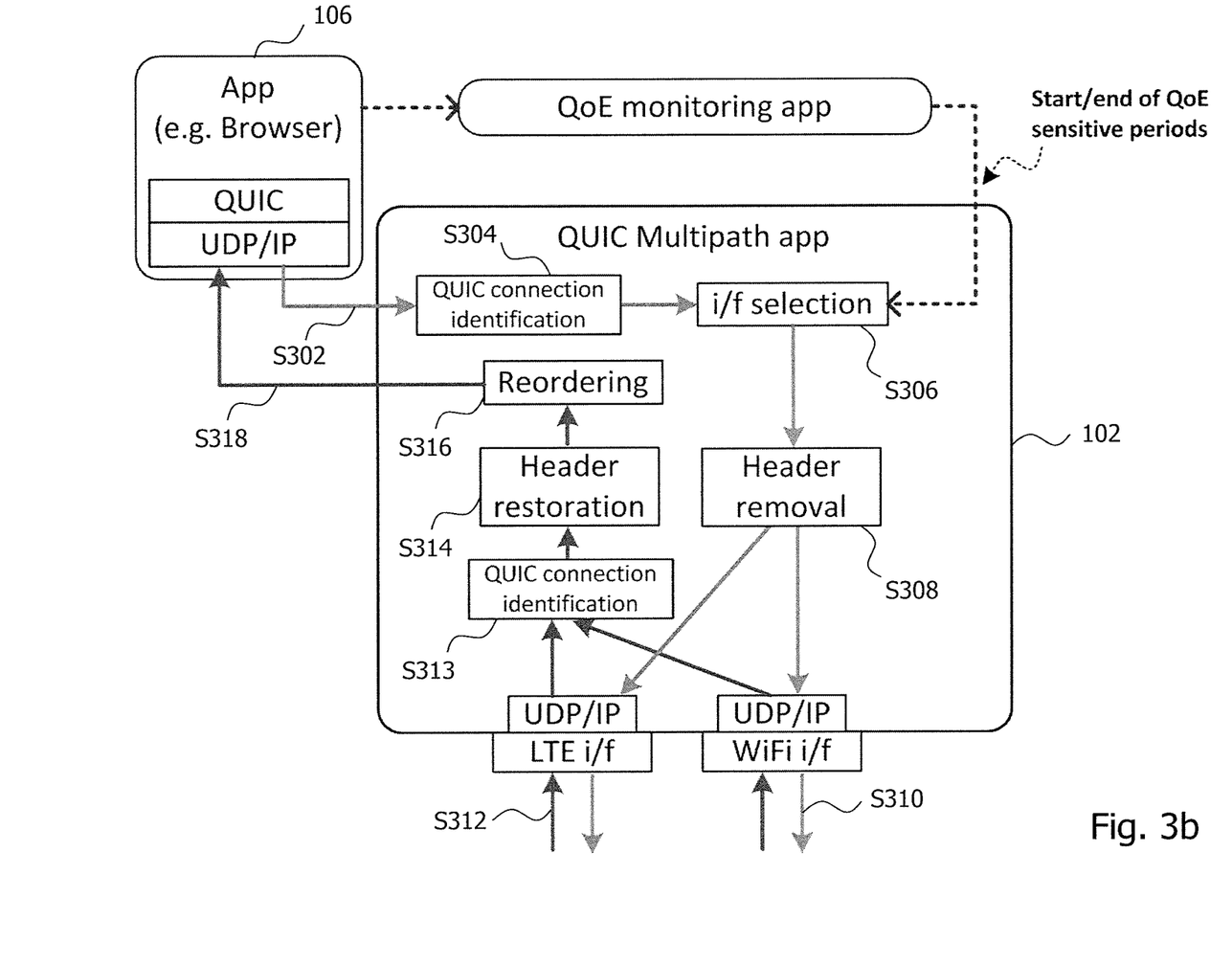

FIG. 3a schematically illustrates an exemplary modular composition of the computing unit 110 which is configured to execute the multipath application 102 and FIG. 3b illustrates a corresponding flow diagram illustrating a method embodiment which may be performed by the multipath application 102. The basic operation of the multipath application 102 will be described in the following with reference to both FIGS. 3a and 3b.

In step S302, a packet reception module 302 of the computing unit 110 may receive a packet from the client application 106, wherein the packet may be destined for the server 108 and associated with a connection established between the client application 106 and the server 108 using the QUIC protocol. As indicated in FIG. 3b, QUIC is a user space (e.g., application layer) protocol atop UDP and IP. In order to determine to which connection the packet belongs, a connection identification module 304 of the computing unit 110 may, in step S304, identify the connection by extracting a connection identification from the packet that uniquely identifies the connection, i.e., the unencrypted CID in the public header of the QUIC packet. The payload of the QUIC packet may be encrypted.

In step S306, an interface selection module 306 of the computing unit 110 may select the interface to be used for transmission of the packet to the multipath proxy 104 (in the figures, the term "interface" is abbreviated by "i/f"). Generally, the interface may be selected based on a QoS requirement regarding the identified connection. In the illustrated example, the QOS requirement is determined by a dedicated QoE monitoring application that may monitor the client application 106 and communicate monitoring results to the multipath application 102. The QoS requirement may be determined based on (e.g., user initiated) activities observed on the execution level of the client application 106, for example. It will be understood that the use of a dedicated QoE monitoring application is merely exemplary and that the QoS requirement may also be determined by the multipath application itself, for example. The QoS requirement could also be provided by the client application 106 to the multipath application 102 directly.

QoS requirements may differ depending on whether the packet is transmitted in a QoE sensitive period or in a QoE insensitive period. A QoE sensitive period may be a period in which a high level of QoS is required to ensure that a high level of QoE is provided to a user. A QoE insensitive period, on the other hand, may be a period in which a lower level of QoS may be sufficient without having a (noticeably) negative impact on the QoE perceived by the user. In web browsing, for example, the QoE sensitive period may correspond to the start render time, i.e., the time required until elements of a web page are first displayed and become interactive, so that visual feedback provides evidence that the browser is responsive and enables to start browsing. Typically, the start render time is recommended to be in the range of 1 to 2 seconds. The QoE insensitive period may be the subsequent download period in which background images of the web page are loaded, for example. In video playback, as another example, the QoE sensitive period may correspond to the initial buffering time before the playback of the video is started, whereas QoE insensitive periods may correspond to periods in which the video buffer is sufficiently filled so that QoS variations do not have a negative impact on the QoE perceived by the user.

As indicated in FIG. 3b, the QoE monitoring application may indicate start times and end times of QoE sensitive periods and/or QoE insensitive periods to the multipath application 102. Depending on whether the packet is transmitted in a QoE sensitive period or in a QoE insensitive period of the connection, a different interface may be selected for transmission of the packet to the multipath proxy 104. The selected interface may thus correspond to a first interface of the plurality of interfaces when the packet is transmitted in a QoE sensitive period, and the selected interface may correspond to a second interface of the plurality of interfaces when the packet is transmitted in a QoE insensitive period. For example, when the packet is transmitted as part of QoE sensitive traffic (i.e., in a QoE sensitive period), the packet may be transmitted via the LTE interface of the computing unit 110, and subsequent packets may be transmitted via the WLAN interface of the computing unit 110 as part of QoE insensitive traffic (i.e., in a QoE insensitive period).

Alternatively or additionally, the interface may also be selected based on a QoS measurement regarding the interfaces of the computing unit 110. The QoS measurement may include a measurement of the reception quality on at least one of the interfaces. For example, it may be decided that the packet may be transmitted via the LTE interface of the computing unit 110 when the QoS measurement indicates that reception quality on the WLAN interface of the computing unit 110 is not satisfactory, or vice versa.

For security reasons, the packet may be transmitted through a VPN tunnel which may have previously been established between the multipath application 102 and the multipath proxy 104. More specifically, the multipath application 102 may have established, for each of the interfaces of the computing unit 110, a VPN tunnel associated with the respective interface with the multipath proxy 104, wherein the packet may be transmitted through the VPN tunnel associated with the selected interface. If Android is used as operating system of the computing unit 110, for example, a VPN tunnel may be realized by implementing an Android VPN service by the multipath application 102 (VPN services are available since Android 4.0). Android VPN services may also be used for port translation, for example. It is to be noted that an application that implements an Android VPN service has a right to access network traffic (including traffic of other applications and including the whole user space packets) forwarded through the corresponding VPN tunnel so that the CID contained in the header of the QUIC packet can be extracted by the multipath application 102.

In order to reduce transmission overhead due to the use of VPN tunnels, the packet may be modified before transmitting the packet through the VPN tunnel. More specifically, the UDP header of the QUIC packet and/or the IP header of the QUIC packet may be removed from the packet, provided that corresponding header restoration data is stored by both the multipath application and the multipath proxy. Such a header removal may generally be possible because the connection (as well as the corresponding endpoints) is uniquely defined by the CID of the QUIC packet. Thus, in step S308, a header removal module 308 of the computing unit 110 may remove at least one of the UDP header and the IP header from the packet before transmitting the packet through the VPN tunnel associated with the selected interface. The outgoing packet may thus contain only one UDP/IP header, namely that of the VPN.

Previously, the multipath application 102 may have stored corresponding header restoration data indicating an association of the CID with at least one of the UDP header and the IP header of packets associated with the connection, and may have transmitted the header restoration data to the multipath proxy 104. The header restoration data may be kept up-to-date by checking the header of each received packet and, in case of a change of at least one of the UDP header and the IP header (e.g., due to a connection migration), the header restoration data may be updated at both the multipath application 102 and the multipath proxy 104. As an example, the header restoration data may have the form of key-value pairs, wherein the CID may be used as the key and the UDP headers and/or IP headers, or at least portions thereof, may be used as the value of the respective key-value pair. The header restoration data may be sent using a custom VPN control message to the multipath proxy 104, for example. When the multipath proxy 104 extracts the CID from the packet, it may use the header restoration data to restore the UDP header and/or the IP header in accordance with the header restoration data based on the unique CID.

In step S310, a package transmission module 310 of the computing unit 110 may then transmit the packet to the multipath proxy 104 via the selected interface for further delivery to the server 108.

The multipath application 102 may also receive response packets originated from the server 108 and destined for the client application 106 from the multipath proxy 104. When VPN tunnels are used, the multipath proxy 104 may have removed the UDP header and/or IP header of the response packet before transmitting the response packet through the respective VPN tunnel. Thus, in step S312, a response packet reception module 312 of the computing unit 110 may receive a response packet from the multipath proxy 104 through the VPN tunnel associated with the selected interface and, further, in step S313, the connection identification module 304 of the computing unit 110 may identify the connection associated with the response packet by extracting the CID from the response packet. In step S314, a header restoration module 314 of the computing unit 110 may then restore at least one of the UDP header and the IP header of the response packet in accordance with the stored header restoration data based on the extracted CID of the response packet.

The multipath application 102 may also support packet reordering to ensure that response packets that are received from the multipath proxy 104 on different interfaces of the computing unit 110 are brought into correct order before delivering the response packets to the client application 106. More specifically, the multipath application 102 may have received a plurality of response packets from the multipath proxy 104, wherein the plurality of response packets are originated from the server 108 and associated with the connection, and wherein a first portion of the plurality of response packets is received via the LTE interface of the computing unit 110 and a second portion of the plurality of response packets is received via the WLAN interface of the computing unit 110. Thus, in step S316, a response packet reordering module 316 of the computing unit 110 may extract, for each of the plurality of response packets, the sequence number SN from the respective response packet, and reorder the plurality of response packets according to the extracted SN. In step S318, a response packet delivery module 318 of the computing unit 110 may deliver the plurality of response packets to the client application 106.

Figure 4A:
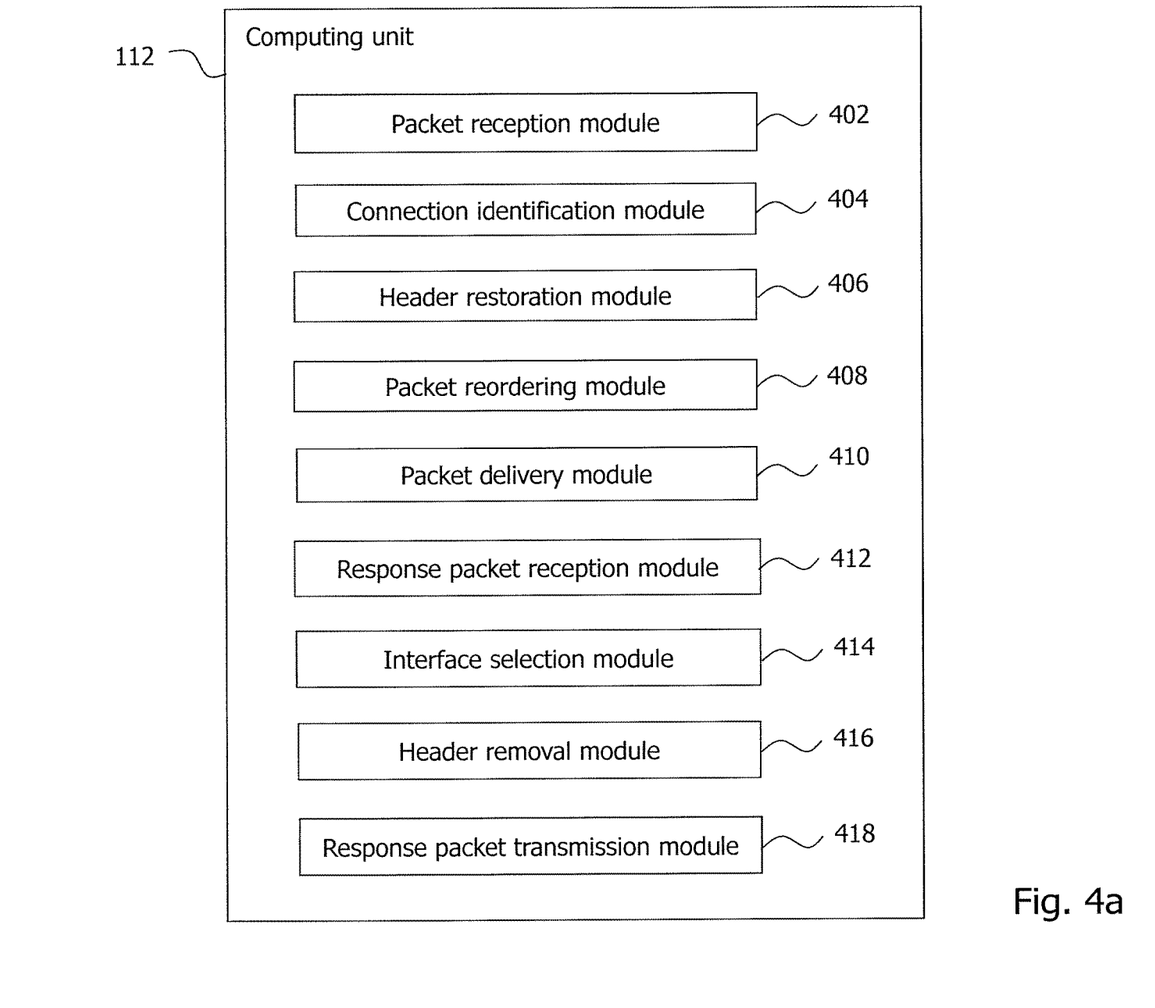
FIGS. 4a and 4b illustrate a modular composition of a computing unit configured to execute the multipath proxy of FIG. 1 and a corresponding flow diagram illustrating a method embodiment which may be performed by the multipath proxy.
Figure 4B:
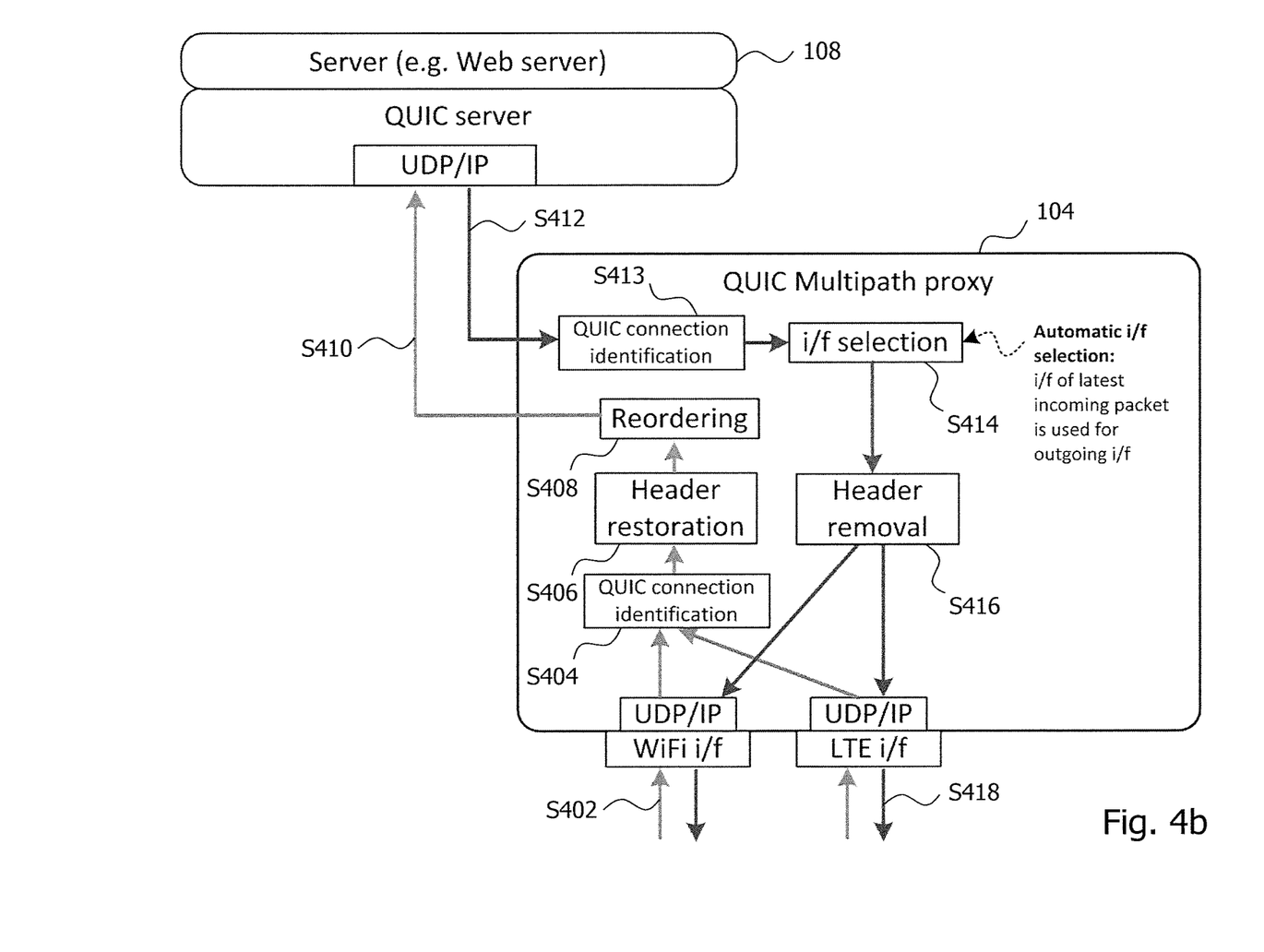

FIG. 4a schematically illustrates an exemplary modular composition of the computing unit 112 which is configured to execute the multipath proxy 104 and FIG. 4b illustrates a corresponding flow diagram illustrating a method embodiment which may be performed by the multipath proxy 104. The basic operation of the multipath proxy 104 will be described in the following with reference to both FIGS. 4a and 4b. The method embodiment of FIG. 4b may be complementary to the method embodiment of FIG. 3b described above.

In step S402, a packet reception module 402 of the computing unit 112 may receive a packet from the multipath application 102, wherein the packet may be originated from the client application 106 and destined for the server 108. The packet may be associated with a connection established between the client application 106 and the server 108 using the QUIC protocol. The packet may be received via a particular interface among the interfaces of the computing unit 112, i.e., the LTE interface or the WLAN interface of the computing unit 112. In order to determine to which connection the packet belongs, a connection identification module 404 of the computing unit 112 may, in step S404, identify the connection by extracting the CID from the packet which uniquely identifies the connection.

When, for each of the interfaces of the computing unit 112, VPN tunnels associated with the respective interfaces have been established between the multipath application 102 and the multipath proxy 104, as described above with reference to FIG. 3b, the packet may be received through the VPN tunnel associated with the particular interface. When at least one of the UDP header and the IP header has been removed from the packet by the multipath application 102 before transmitting the packet through the VPN tunnel, a header restoration module 406 of the computing unit 112 may, in step S406, restore at least one of the UDP header and the IP header of the packet in accordance with the stored header restoration data based on the extracted CID of the packet. Previously, the multipath proxy 104 may have received the header restoration data from the multipath application 102, and may have stored the header restoration data accordingly. The header restoration data may have the form of key-value pairs, as described above with reference to FIG. 3b.

Similar to the multipath application 102, the multipath proxy may support packet reordering to ensure that packets that which are received from the multipath application 102 on different interfaces of the computing unit 112 are brought into correct order before delivering the packets to the server 108. More specifically, the multipath proxy 104 may have received a plurality of packets from the multipath application 102, wherein the plurality of packets are originated from the client application 106 and associated with the connection, and wherein a first portion of the plurality of packets is received via the LTE interface of the computing unit 112 and a second portion of the plurality of packets is received via the WLAN interface of the computing unit 112. Thus, in step S408, a packet reordering module 408 of the computing unit 112 may extract, for each of the plurality of packets, the sequence number SN from the respective packet, and reorder the plurality of packets according to the extracted SN. In step S410, a packet delivery module 410 of the computing unit 112 may deliver the plurality of packets to the server 108.

The multipath proxy 104 may also receive response packets destined for the client application 106 from the server 108. Thus, in step S412, a response packet reception module 412 of the computing unit 112 may receive a response packet from the server 108, wherein the response packet is destined for the client application 106 and associated with the connection. In order to determine to which connection the response packet belongs, the connection identification module 404 of the computing unit 112 may, in step S413, identify the connection by extracting the CID from the response packet. Further, in step S414, an interface selection module 414 of the computing unit 112 may select interface to be used for transmission of the response packet to the multipath application 102 as an interface among the interfaces of the computing unit 112 on which a recent packet associated with the connection has been received from the multipath application 102. Also, a header removal module 416 of the computing unit 112 may, in step S416, remove at least one of the UDP header and the IP header from the response packet before transmitting the response packet through the VPN tunnel associated with the selected interface. Finally, in step S418, a response packet transmission module 418 may transmit the response packet to the multipath application 102 for delivery to the client application 106.

As has become apparent from the above, the present disclosure provides a technique for enabling connection-oriented multipath transmission between a client application and a server. In particular, the technique presented herein may provide an application agnostic multipath solution in which client applications are unaware of the multipath capabilities of the underlying system. For developers, it may thus not be necessary to compile multipath features into client applications at development time. Since the presented technique may be realized at the application layer (i.e., by use of the multipath application and the multipath proxy), the technique may enable multipath transmission even for client applications that employ user space (e.g., application layer) based transport protocols, such as QUIC. The presented technique may generally not require any root access in underlying operating systems and may be independent from corresponding kernel upgrades. The presented technique may also enable operators to provide trusted QoS support on client devices without requiring that client applications perform necessary QoS parameter settings and traffic classification themselves. Even the use of VPN tunnels may not result in additional traffic overhead since the VPN overhead may be reduced by header modifications that make use of the fact that upper layer protocol headers may contain an ID that uniquely identifying a connection and its endpoints (e.g., the CID of QUIC) and thereby allow the removal of unnecessary or redundant lower layer protocol headers, provided that the removed headers can be restored based on the unique ID.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A computing unit for executing a multipath application enabling connection-oriented multipath transmission between a client application and a server, the computing unit comprising:
processing circuitry;
memory containing instructions executable by the processing circuitry whereby the multipath application of the computing unit is operative to:
receive a packet from the client application, the packet being destined for the server and associated with a connection established between the client application and the server using a connection-oriented transport protocol;
select an interface from a plurality of interfaces of the computing unit for transmission of the packet to a multipath proxy for delivery to the server, wherein the selected interface corresponds to:
a first interface of the plurality of interfaces when the packet is transmitted in a quality of experience sensitive period of an identified connection; and
a second interface of the plurality of interfaces when the packet is transmitted in a quality of experience insensitive period of the identified connection; and
transmit the packet to the multipath proxy via the selected interface.

2. A computing unit for executing a multipath proxy enabling connection-oriented multipath transmission between a client application and a server, the computing unit comprising:
processing circuitry;
memory containing instructions executable by the processing circuitry whereby the multipath proxy of the computing unit is operative to:
receive a packet from a multipath application, the packet being originated from the client application and destined for the server, the packet being associated with a connection established between the client application and the server using a connection-oriented transport protocol, and the packet being received via a particular interface among a plurality of interfaces of the computing unit, wherein the particular interface is:
a first interface of the plurality of interfaces when the packet is transmitted in a quality of experience sensitive period of the connection; and
a second interface of the plurality of interfaces when the packet is transmitted in a quality of experience insensitive period of the connection; and
deliver the packet to the server.

3. A method performed by a multipath application, the multipath application being executed on a computing unit and enabling connection-oriented multipath transmission between a client application and a server, the method comprising:
receiving a packet from the client application, the packet being destined for the server and associated with a connection established between the client application and the server using a connection-oriented transport protocol;
selecting an interface from a plurality of interfaces of the computing unit for transmission of the packet to a multipath proxy for delivery to the server, wherein the selected interface corresponds to:
a first interface of the plurality of interfaces when the packet is transmitted in a quality of experience sensitive period of an identified connection; and
a second interface of the plurality of interfaces when the packet is transmitted in a quality of experience insensitive period of the identified connection; and
transmitting the packet to the multipath proxy via the selected interface.

4. The method of claim 3, wherein the connection-oriented transport protocol is a Quick UDP Internet Connections (QUIC) protocol.

5. The method of claim 3:
further comprising identifying the connection by extracting a connection identification from the packet, the connection identification uniquely identifying the connection;
wherein a payload of the packet is encrypted; and
wherein the connection identification is included in a non-encrypted header of the packet.

6. The method of claim 3 further comprising identifying the connection by extracting a connection identification from the packet, the connection identification uniquely identifying the connection.

7. The method of claim 3, wherein the interface is selected based on a quality of service measurement regarding the plurality of interfaces.

8. The method of claim 3:
wherein the method further comprises establishing, for each of the plurality of interfaces, a Virtual Private Network (VPN) tunnel associated with the respective interface with the multipath proxy; and
wherein the packet is transmitted through the VPN tunnel associated with the selected interface.

9. The method of claim 8, wherein the method further comprises:
storing header restoration data indicating an association of the connection identification with a transport layer header and/or a network layer header of packets associated with the connection; and
transmitting the header restoration data to the multipath proxy.

10. The method of claim 8, wherein the method further comprises removing a transport layer header and/or a network layer header from the packet before transmitting the packet through the VPN tunnel associated with the selected interface.

11. The method of claim 9, wherein the method further comprises:
receiving a response packet from the multipath proxy through the VPN tunnel associated with the selected interface, the response packet being originated from the server and associated with the connection, wherein a transport layer header and/or a network layer header of the response packet has been removed from the response packet by the multipath proxy;
identifying the connection associated with the response packet by extracting a connection identification from the response packet; and
restoring the transport layer header and/or the network layer header of the response packet in accordance with the stored header restoration data based on the extracted connection identification of the response packet.

12. The method of claim 3, wherein the method further comprises:
receiving a plurality of response packets from the multipath proxy, the plurality of response packets being originated from the server and associated with the connection, wherein a first portion of the plurality of response packets is received via a first interface of the plurality of interfaces and a second portion of the plurality of response packets is received via a second interface of the plurality of interfaces;
extracting, for each of the plurality of response packets, a sequence number from the respective response packet; and
reordering the plurality of response packets according to the extracted sequence numbers before delivering the plurality of response packets to the client application.

13. A method performed by a multipath proxy, the multipath proxy being executed on a computing unit and enabling connection-oriented multipath transmission between a client application and a server, the method comprising:
receiving a packet from a multipath application, the packet being originated from the client application and destined for the server, the packet being associated with a connection established between the client application and the server using a connection-oriented transport protocol, and the packet being received via a particular interface among a plurality of interfaces of the computing unit, wherein the particular interface is:
a first interface of the plurality of interfaces when the packet is transmitted in a quality of experience sensitive period of the connection; and
a second interface of the plurality of interfaces when the packet is transmitted in a quality of experience insensitive period of the connection; and
delivering the packet to the server.

14. The method of claim 13, wherein the connection-oriented transport protocol is a Quick UDP Internet Connections (QUIC) protocol.

15. The method of claim 13:
further comprising identifying the connection by extracting a connection identification from the packet, the connection identification uniquely identifying the connection;
wherein a payload of the packet is encrypted; and
wherein the connection identification is included in a non-encrypted header of the packet.

16. The method of claim 13:
wherein, for each of the plurality of interfaces, a VPN tunnel associated with the respective interface is established between the multipath application and the multipath proxy; and
wherein the packet is received through the Virtual Private Network (VPN) tunnel associated with the particular interface.

17. The method of claim 16, wherein the method further comprises:
receiving header restoration data from the multipath application, the header restoration data indicating an association of the connection identification with a transport layer header and/or a network layer header of packets associated with the connection; and
storing the header restoration data.

18. The method of claim 16:
wherein a transport layer header and/or a network layer header has been removed from the packet by the multipath application, and
wherein the method further comprises restoring the transport layer header and/or the network layer header of the packet in accordance with the stored header restoration data based on the extracted connection identification of the packet.

19. The method of claim 13, wherein the method further comprises:
receiving a plurality of packets from the multipath application, the plurality of packets being originated from the client application and associated with the connection, wherein a first portion of the plurality of packets is received via a first interface of the plurality of interfaces and a second portion of the plurality of packets is received via a second interface of the plurality of interfaces;
extracting, for each of the plurality of packets, a sequence number from the respective packet; and
reordering the plurality of packets according to the extracted sequence numbers before delivering the plurality of packets to the server.

20. The method of claim 13, wherein the method further comprises:
receiving a response packet from the server, the response packet being destined for the client application and associated with the connection; and
transmitting the response packet to the multipath application for delivery to the client application, wherein the response packet is transmitted via an interface among the plurality of interfaces on which a recent packet associated with the connection has been received from the multipath application.

* * * * *